United States Patent
Johnston

(10) Patent No.: US 8,156,318 B2
(45) Date of Patent: Apr. 10, 2012

(54) STORING A DEVICE MANAGEMENT ENCRYPTION KEY IN A NETWORK INTERFACE CONTROLLER

(75) Inventor: David Johnston, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 806 days.

(21) Appl. No.: 12/133,251

(22) Filed: Jun. 4, 2008

(65) Prior Publication Data

US 2009/0307474 A1 Dec. 10, 2009

(51) Int. Cl.
*G06F 9/00* (2006.01)
(52) U.S. Cl. .......................................... 713/2
(58) Field of Classification Search ....................... 713/2
See application file for complete search history.

(56) References Cited

U.S. PATENT DOCUMENTS

| | | | |
|---|---|---|---|
| 2002/0174348 A1* | 11/2002 | Ting | 713/186 |
| 2003/0187999 A1* | 10/2003 | Callum | 709/229 |
| 2003/0188161 A1* | 10/2003 | Ndiaye | 713/168 |
| 2005/0071677 A1* | 3/2005 | Khanna et al. | 713/201 |
| 2009/0019167 A1* | 1/2009 | Taaghol | 709/228 |

* cited by examiner

*Primary Examiner* — Peter Poltorak
*Assistant Examiner* — Teshome Hailu
(74) *Attorney, Agent, or Firm* — Schwabe, Williamson & Wyatt, P.C.

(57) ABSTRACT

A device management system for securely storing an encryption key associated with a device management session. The device management system includes an encryption key generator to generate an encryption key, a client device to receive an encrypted bootstrap data file transmitted by a base station, and a network interface controller coupled to the client device, the network interface controller to store the encryption key separate from a system memory of the client device. Embodiments of the device management system ensure user credentials do not exist in the client device in plaintext form outside of the network interface controller, thus preventing software and/or malware executed on the host from extracting such credentials.

18 Claims, 3 Drawing Sheets

STORING A DEVICE MANAGEMENT ENCRYPTION KEY IN A NETWORK INTERFACE CONTROLLER

BACKGROUND OF THE INVENTION

Carriers of Worldwide Interoperability for Microwave Access (WIMAX) networks, plan to use the Open Mobile Alliance (OMA) for Device Management (DM) protocol, or another potential provisioning mechanism, to pass user credentials to a client device at first use, in order to create a seamless provisioning of the client device without user intervention. A device management session is a method of distributing software updates to enable services on a client device, including settings which enable the client device to access services provided by a network service provider. These user credentials are passed to a database in the client device. The database is managed by the OMA software, and the user credentials are stored in system memory on the client device for future use when logging onto the WIMAX network.

It is widely considered that the system memory of the client device is not a safe place to store a user credential. Viruses, remote root attacks, rootkits, and other forms of malware may be able to gain access to the user credential stored in the client device's RAM, hard disk, or other type of storage.

Presently, provisioning happens after device authentication takes place using a client device certificate, yielding a master session key (MSK) that is used at the root of a key derivation function in order to derive a lower encryption key. Presently, a boot strap document is transferred to the client device at the network layer (L3), thus passing straight to the OMA client in the client device, without being parsed by the client device's network interface controller.

BRIEF DESCRIPTION OF THE DRAWINGS

Throughout the description, similar reference numbers may be used to identify similar elements.

DETAILED DESCRIPTION

Figure 1:
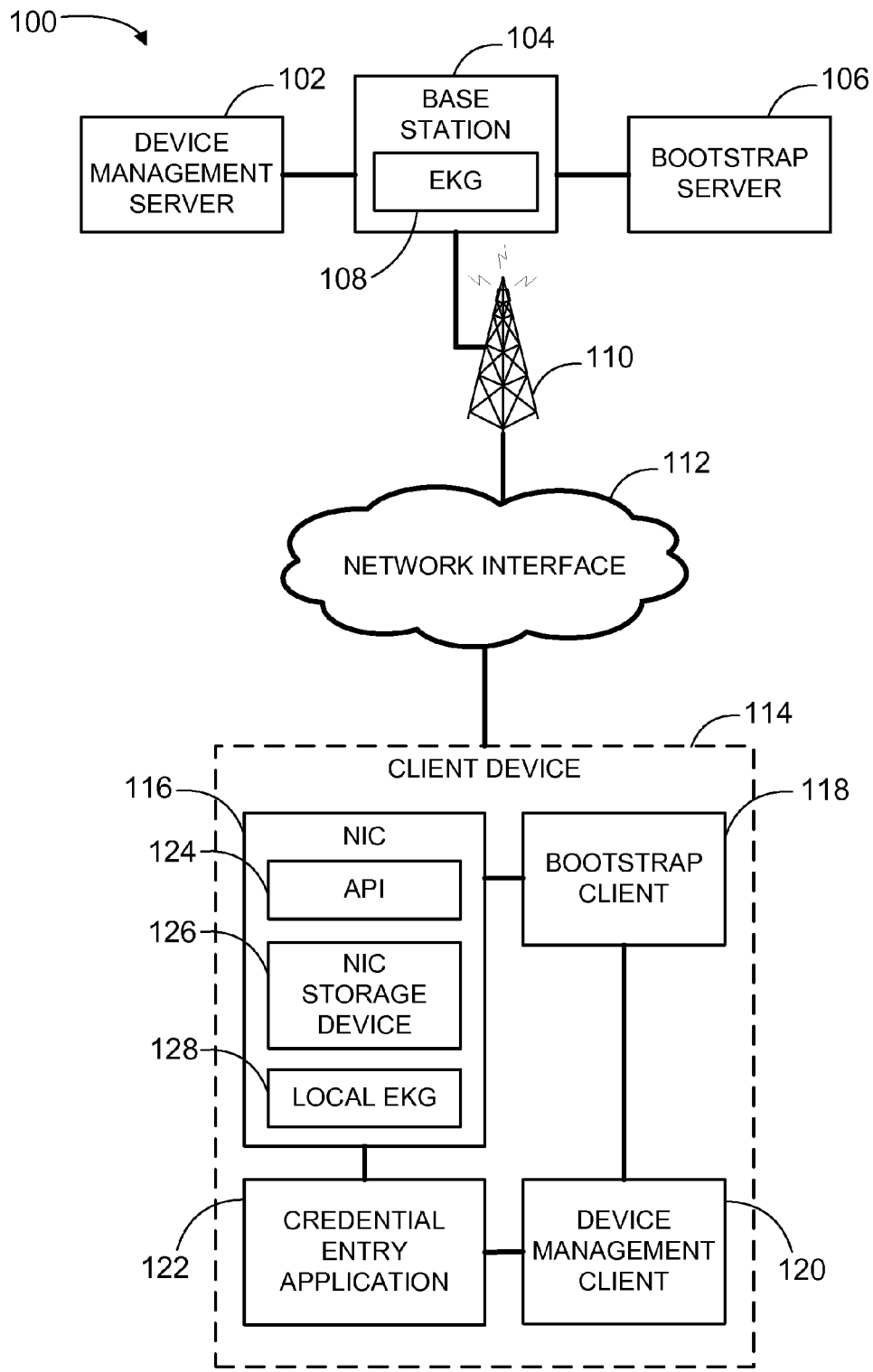
FIG. 1 depicts a schematic block diagram of one embodiment of a device management system.

FIG. 1 depicts a schematic block diagram of one embodiment of a device management system 100. As depicted in FIG. 1, the device management system 100 includes a device management server 102, a base station 104, a bootstrap server 106, a base station antenna 110, a network interface 112, and a client device 114. Although the depicted device management system 100 is shown and described herein with certain components and functionality, other embodiments of the device management system 100 may be implemented with fewer or more components or with less or more functionality. For example, some embodiments of the device management system 100 include a plurality of device management servers 102, a plurality of bootstrap servers 106, and a plurality of network interfaces 112. Additionally, some embodiments of the device management system 100 include similar components arranged in another manner to provide similar functionality, in one or more aspects.

The device management server 102 initiates a device management session to distribute a software update to a client device 114. The software update may include settings that enable the client device 114 to access services provided by a network service provider. In one embodiment, the device management server 102 sends a notification SMS trigger to initiate a device management session. The notification SMS message may include a server identification (ID) and a request for the client device 114 to initiate a device management session with the device management server 102. The client device 114 may use the server ID to verify that the server is authorized to communicate with it. A device management session may include HTTP provisioning, server provisioning, user provisioning, over-the-air provisioning (OTAP), over-the-air parameter administration (OTAPA), over-the-air programming (OTAP), over-the-air service provisioning (OTASP), mobile content provisioning, mobile subscriber provisioning, and/or another type of provisioning.

The device management server 102 establishes a connection with a client device 114 through the base station 104. In some embodiments, the base station 104 is a network access provider. The base station 104 includes an encryption key generator (EKG) 108. The base station 104 processes communication packets between the client device 114, the device management server 102, and/or the bootstrap server 106. In one embodiment, the base station 104, via the EKG 108, generates an encryption key. In one embodiment, the EKG 108 is a key derivation function. The EKG 108 may be implemented as software, firmware, and/or hardware. The base station 104 may generate a bootstrap encryption key (BEK) to encrypt a bootstrap data file and/or a user credential encryption key (UCEK) to encrypt a user credential. In some embodiments, the base station 104 generates the encryption key using the counter with cipher block chaining message authentication code (CCM) mode of the advanced encryption standard (AES) to generate an encryption key.

The bootstrap server 106 generates a bootstrap data file, or bootstrap document, according to the parameters of a given device management session. For example, the bootstrap data file may include a bootstrap image to install a service or upgrade patch on the client device 114. The bootstrap data file may also include parameters for setting up a new service on the client device 114 such as internet chat or mail services. Furthermore, the bootstrap data file may include customizable content on the client device 114 such as screen form factors, media decoding capabilities, language settings, and other similar content that is specific to a version and type of a given client device 114. In one embodiment, the bootstrap server 106 includes a bootstrap image and a user credential in the bootstrap data file. The bootstrap server 106 receives the BEK and the UCEK from the base station 104. The bootstrap server 106 encrypts the user credential with the UCEK supplied by the base station 104. Thus, the bootstrap server 106 includes a UCEK-encrypted user credential in the bootstrap data file.

In some embodiments, the bootstrap server 106 adds random bits to the bootstrap data file. The random bits include a salt and/or a nonce. A salt includes random bits used as one of the inputs to a key derivation function, or EKG 108, which the base station 104 uses to derive an encryption key. Nonce stands for numbers used once, which is a set of random bits that ensure old communications are not reused in replay attacks. The bootstrap server 106 then encrypts the bootstrap image, UCEK-encrypted user credential, and random bits using the BEK.

Following the generation of the BEK-encrypted bootstrap data file, the bootstrap server 106 sends the BEK-encrypted bootstrap data file to the client device 114 through the base station antenna 110. The base station antenna 110 may include an omni-directional antenna, directional antenna, sectoral antenna, panel antenna, or another type of antenna. In some embodiments, the base station antenna 110 modulates the BEK-encrypted bootstrap data file using binary phase-shift keying (BPSK), quadrature phase-shift keying (QPSK), or quadrature amplitude modulation and sends a modulated BEK-encrypted bootstrap data file over the air (OTA). In other embodiments, the base station 104 sends the BEK-encrypted bootstrap data file over physical transmission lines, for example, using TCP/IP. Thus, the network interface 112 may facilitate OTA transmissions such as WiMAX, Wi-Fi, 3GPP, UMTS, GSM, HSPA, etc., as well as physical transmissions, such as TCP/IP.

The client device 114 includes a network interface controller 116, a bootstrap client 118, a device management client 120, and a credential entry application 122. The client device 114 receives the BEK-encrypted bootstrap data file through the network interface controller 116. The client device 114 may be a desktop computer, a laptop computer, a personal digital assistant (PDA), a cell-phone, a voice-over internet protocol (VoIP) telephone, or similar client device.

The network interface controller 116 includes an application programming interface (API) 124, a network interface controller (NIC) storage device 126, and a local encryption key generator (EKG) 128. The application programming interface 124 is a program interface that allows the network interface controller 116 to interface with applications running on the client device 114. The NIC storage device 126 is a data storage device or memory device. In some embodiments, the NIC storage device 126 is a static data storage device, such as a read-only memory (ROM) or flash memory device. In one embodiment, the network interface controller 116 stores an encryption key on the NIC storage device 126. The network interface controller 116 stores the encryption key separate from a system memory of the client device 114, such as system random access memory (RAM) or a system hard drive (not shown). Storing the encryption key in the network interface controller 116 prevents access to the encryption key by viruses, remote root attacks, root-kits, and other forms of malware that may be executed on the system memory, or system data storage, of the client device 114. Conversely, storing an encryption key on the system memory of the client device 114 exposes the encryption key to potential malware executed on the client device 114. When an encryption key is stored on system memory of the client device 114 instead of on the NIC storage device 126, malware executed on the client device 114 may access and potentially crack the encryption key, rendering all the data encrypted with the cracked encryption key open to unauthorized decryption. Thus, storing an encryption key in the network interface controller 116 provides a secure location to store an encryption key in order to maintain the indecipherable status of encrypted data stored on the client device 114.

In one embodiment, the network interface controller 116, via the local EKG 128, generates a local encryption key. In one embodiment, the local EKG 128 is a key derivation function. The local EKG 128 may be implemented as software, firmware, and/or hardware. In some embodiments, the local EKG 128 allows the network interface controller 116 to decrypt an encryption key.

The bootstrap client 118 receives the BEK-encrypted bootstrap data file, which is passed through the network interface controller 116. In one embodiment, the bootstrap client 118 sends the BEK-encrypted bootstrap data file back to the network interface controller 118. Since only the network interface controller 116 stores the BEK and UCEK encryption keys, the bootstrap client 118 is unable to decrypt the BEK-encrypted bootstrap data file. Likewise, any other component of the client device 114 besides the network interface controller 116 is unable to decrypt an encrypted data file that is associated with a device management session. Thus, the network interface controller 116 receives the BEK-encrypted bootstrap data file from the bootstrap client 118. In some embodiments, the network interface controller 116 decrypts the BEK-encrypted bootstrap data file and parses the content of the decrypted bootstrap data file. The network interface controller 116 sends the bootstrap image, contained in the BEK-encrypted bootstrap data file, and the plaintext bootstrap image to the device management client 120 through the bootstrap client 118. The plaintext bootstrap image is the pre-encrypted representation of the data before any action has been taken to conceal it. The plaintext version is used as input to an encryption algorithm. The output of the encryption algorithm is termed ciphertext. The device management client 120 then applies the bootstrap image to the client device 114.

In some embodiment, the network interface controller 116 may send the UCEK-encrypted user credential and/or the plaintext user credential outside of the network interface controller 116. In other embodiments, the network interface controller 116 does not send the UCEK or the BEK encryption keys outside of the network interface controller 116. Since the BEK encryption key is generated as part of the process of initial authentication, to which the network interface controller 116 is a party, the network interface controller 116 is able to compute the BEK to decrypt the BEK-encrypted bootstrap data file. Likewise, the network interface controller 116 is also able to compute the UCEK and, thus decrypt the UCEK-encrypted user credential. In one embodiment, the network interface controller 116 computes and decrypts the BEK and/or UCEK via the local EKG 128.

The application programming interface 124 in the network interface controller 116 is a source code interface that the operating system or library of the client device 114 provides to support requests for services to be made of the network interface controller 116 by computer program running on the network interface controller 116. In other words, the application programming interface 124 is an inter-program interface that allows programs on the client device 114 interface the network interface controller 116. In one embodiment, the credential entry application 122 allows a user of the client device 114 to manually enter a plaintext user credential on the client side, as the Federal Information Processing Standard (FIPS), specifically FIPS-140, tolerates passing the user credential over the application programming interface 124 in plaintext. In some embodiments, the credential entry application 122 may mask the input of the plaintext user credential, such as replacing a typed character on-screen representation with asterisks. The user credential entry application 122 interfaces the network interface controller 116 through the application programming interface 124 in order to install the plaintext credential in the network interface controller 116. In some embodiments, the network interface controller 116 generates a UCEK encryption key locally in response to receiving the plaintext user credential from the credential entry application 122 via the application programming interface 124. The network interface controller 116 then encrypts the plaintext user credential using the locally generated UCEK. In some embodiments, the network interface controller 116 generates the UCEK encryption key with a certain amount of random bits, as explained above with reference to salt and nonce. In some embodiments, the network interface controller 116 then sends the UCEK-encrypted user credential to the device management client 120 for storage, by way of the bootstrap client 118.

Figure 2:
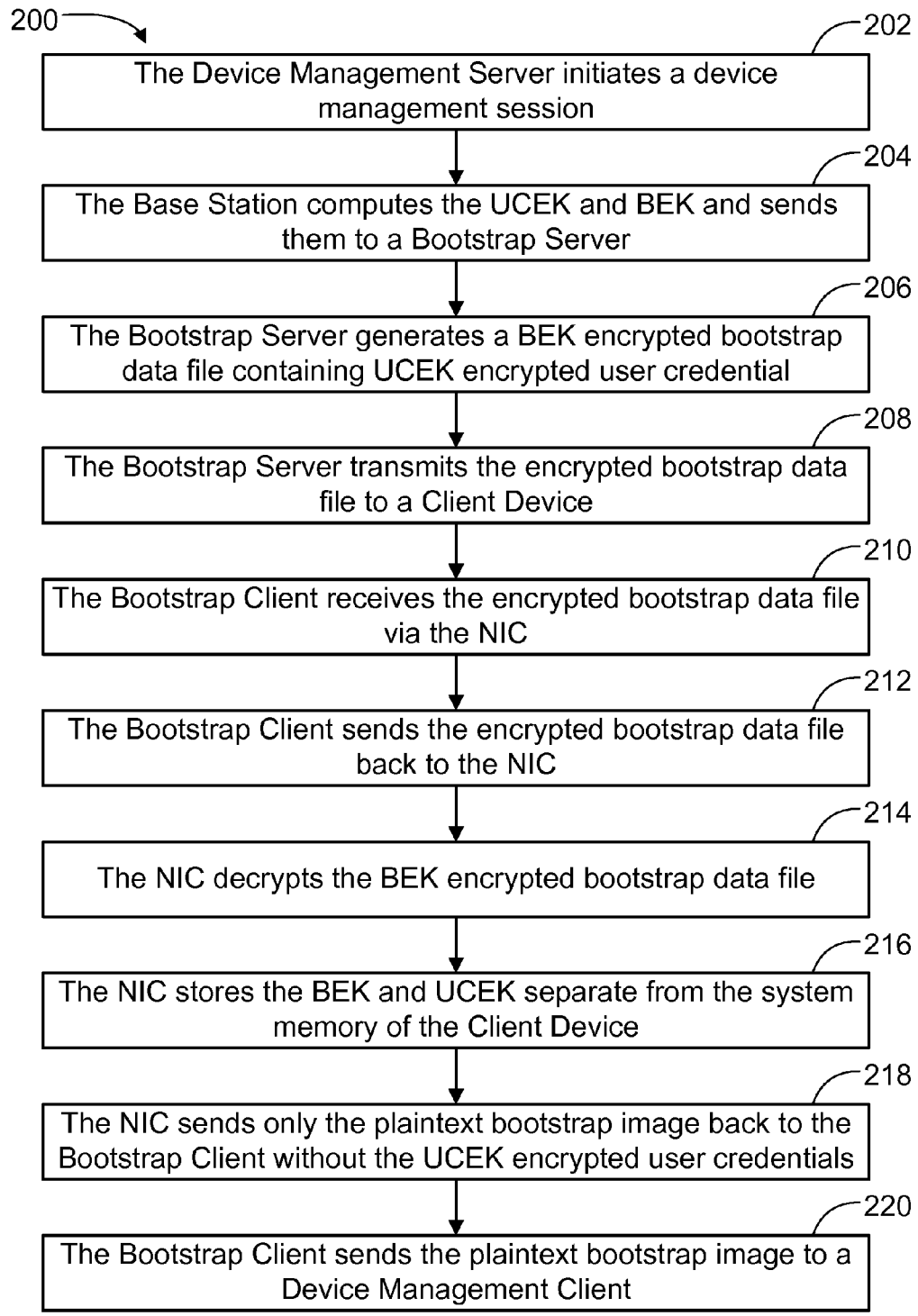
FIG. 2 depict a schematic flow chart diagram of one embodiment of an encryption key storage method for use with the device management system of FIG. 1.

FIG. 2 depict a schematic flow chart diagram of one embodiment of an encryption key storage method 200 for use with the device management system 100 of FIG. 1. Although the encryption key storage method 200 is described in conjunction with the device management system 100 of FIG. 1, some embodiments of the method 200 may be implemented with other types of device management systems.

At block 202, in one embodiment, the device management server 102 initiates a device management session with a client device 114. A typical device management session has two phases, a setup phase and a management phase. In the setup phase, the device management server 102 sends an unsolicited alert through, for example, a notification initiation alert mechanism (e.g., SMS or instant message). In another embodiment, the client device 114 initiates a device management session with the device management server 102 without sending the alert. Also in the setup phase the client device 114 sends the client initialization information, including client credentials and device information, to the device management server 102. Additionally, the client device 114 may send a token in the client initialization information the token informs the device management server 102 if the session is a client initiated session or a server initiated session. The token may be used so the device management server 102 can synchronize a server initiated session with an initial incoming request from the client device 114, since, from the perspective of the device management server 102, server initiated sessions will look the same as client initiated sessions and a token may be implemented to distinguish the two types. Also in the setup phase, the device management server 102 sends the server initialization information, including server credentials, initial management operations and/or user interaction commands from the server, to the client device 114. This concludes the setup phase of the device management session.

In the management phase, the client device 114 responds to the server initial management operations with the results of the management message as well as any user interaction command results. At block 204, the base station 104 computes the bootstrap encryption key (BEK) and the user credential encryption key (UCEK), both of which may be derived from a higher key, such as a master authentication key. The base station 104 then sends the BEK and UCEK to the bootstrap server 106. In one embodiment, the base station 104 implements a key derivation function, such as a cryptographic hash function, to derive an encryption key. As one of the inputs to the key derivation function, the base station 104 may use random bits such as a salt, which may include a nonce (number used once) and/or an initialization vector. In some embodiments, the initialization vector is implemented as a salt. Encryption of the same plaintext with the same key results in the same ciphertext every time, which is a considerable threat to security. Use of an initialization vector linearly added to (XORed with) the first block of plaintext or included in front of the plaintext prior to encryption in one of the streaming modes of operation solves this problem. Salt data complicates dictionary attacks that use pre-encryption of dictionary entries. Each bit of salt used doubles the amount of storage and computation required, strengthening the encryption. The other input is the user credential. The output of the key derivation function is stored as the encrypted version, or UCEK, of the user credential.

At block 206, the bootstrap server 106 generates a bootstrap data file according to the parameters of the device management session. For example, the bootstrap image may install a service or upgrade to the client device 114, or may include parameters for setting up a new service such as internet or email. Additionally, the bootstrap image may contain customizable content, such as media codex, language settings, and other similar content that is specific to a version and type of a given client device 114. The bootstrap data file includes a bootstrap image, the UCEK-encrypted user credential, and like the encryption of the user credential, the bootstrap encryption key may be combined with random bits of salt to strengthen the encryption key. The bootstrap server 106 encrypts the bootstrap data file using the BEK with a specific number of salt bits.

At block 208, the bootstrap server transmits the encrypted bootstrap data file to the client device 114. The transmission of the encrypted bootstrap data file may be over a wired connection or over a wireless transmission. Exemplary wired connections include 10/100/1000 BASE-T Ethernet, Universal Serial Bus (USB), Institute of Electrical and Electronics Engineers (IEEE) 1394, Revised Standard 232 (RS-232), etc. Wireless communications of the encrypted bootstrap data file may be transmitted, in one embodiment, over a base station antenna 110. Exemplary wireless connections include Wireless-Fidelity (Wi-Fi), WiMAX, 3rd Generation Partnership Project (3GPP), Universal Mobile Telecommunications System (UMTS), High-Speed Packet Access (HSPA), Infrared Data Association (IrDa), Bluetooth, including transport layers implemented over any of Wireless Access Protocol (WAP), Hypertext Transfer Protocol (HTTP), Object Exchange (OBEX), or other similar transports. At block 210, the bootstrap client 118 receives the encrypted bootstrap data file from the network interface controller 116 over layer 3 (L3), which is the network layer of the Open Systems Interconnection (OSI) seven layer model. However, instead of forwarding the encrypted bootstrap data file on to the device management client 120, at block 212 the bootstrap client 118 sends the encrypted bootstrap data file back to the network interface controller 116. Passing the encrypted bootstrap data file back to the network interface controller 116 for decryption ensures that the storage of any encryption key associated with a device management session is kept separate from any system memory of the client device 114, including ROMs, RAMs, flash memory, hard drives, where malware such as dictionary attacks and brute force attacks may be used to extract the encryption key.

At block 214, the network interface controller 116 decrypts the encrypted bootstrap data file with the bootstrap encryption key (BEK). Since the network interface controller 116 is privy to the authentication process involved in the setup phase of the device management session, the network interface controller 116 is able to compute the BEK and UCEK. In one embodiment, the only component of the client device 114 that stores the BEK, UCEK, and any other encryption key associated with a device management session is the network interface controller 116. Thus, the plaintext version of the user credential, in one embodiment, only exists in the network interface controller 116.

At block 216, the network interface controller 116 stores the BEK, UCEK, and any other encryption key associated with the device management session in the network interface controller 116. At block 218, the network interface controller 116 parses the decrypted bootstrap data file, separating the decrypted bootstrap image from the UCEK-encrypted user credential. The network interface controller 116 retains the UCEK-encrypted user credential, and sends the plaintext bootstrap image back to the bootstrap client 118.

At block 220, the bootstrap client 118 forwards the plaintext bootstrap image to the device management client 120.

The device management client 120 then applies the bootstrap image to the client device 114, according to the parameters and specification of the device management session. Lastly, the device management server 102 will either close the device management session or begin a new iteration if more management operations are requested or required to complete the device management session. The iterations continue until the device management server 102 sends a message to the client device 114 to close the device management session.

Figure 3:
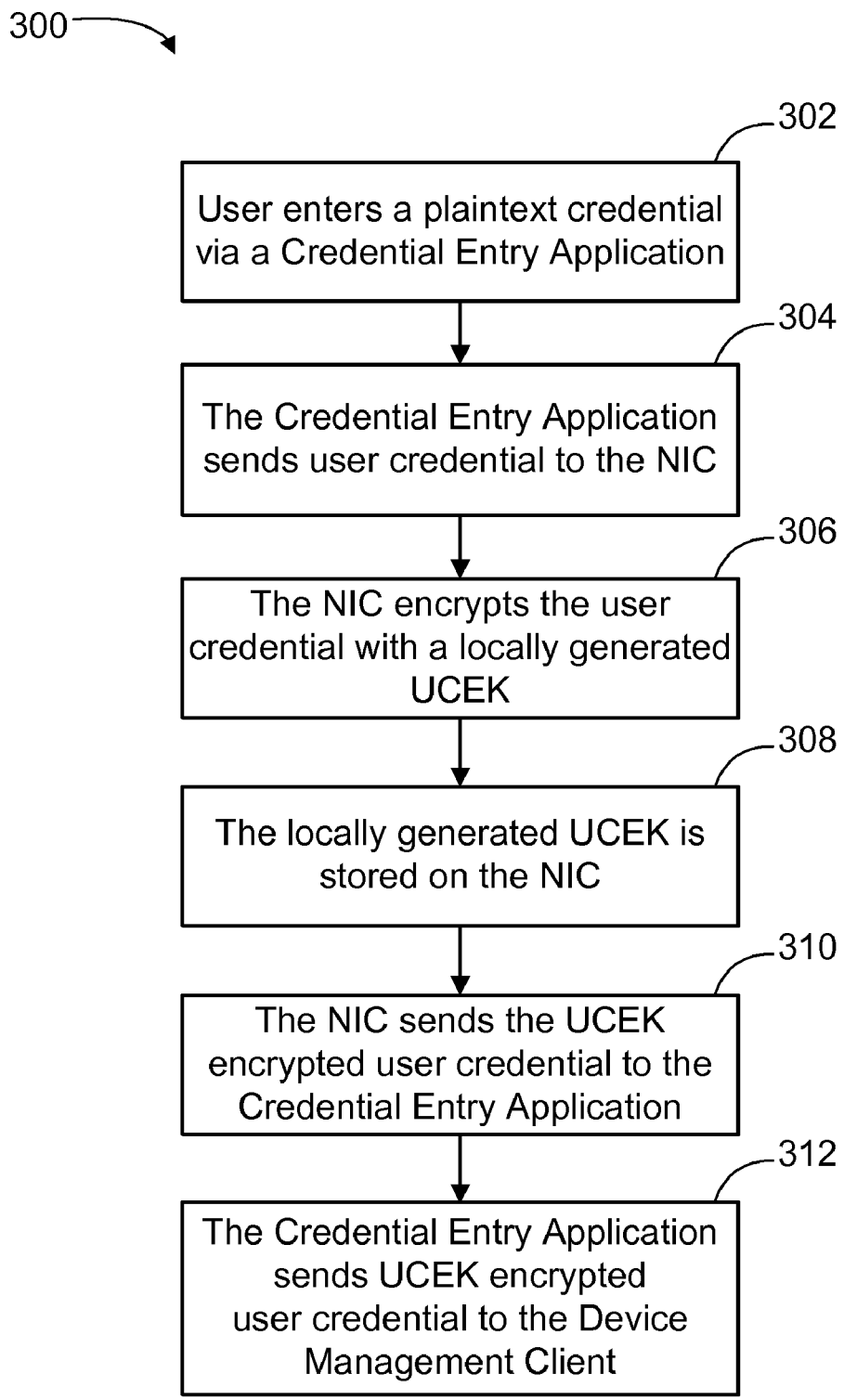
FIG. 3 depicts a schematic flow chart diagram of one embodiment of a locally generated encryption key storage method for use with the device management system of FIG. 1.

FIG. 3 depicts a schematic flow chart diagram of one embodiment of a locally generated encryption key storage method 300 for use with the device management system 100 of FIG. 1. Although the locally generated encryption key storage method 300 is described in conjunction with the device management system 100 of FIG. 1, some embodiments of the method 300 may be implemented with other types of device management systems.

At block 302, in one embodiment, a user on the client device 114 enters a plaintext version of the user credential into a credential entry application 122. The credential entry application 122 may implement security precautions to protect the plaintext version of the user credential prior to any encryption of the plaintext version of the user credential. For example, the credential entry application 122 may include an entry box on a screen (not shown) of the client device 114 where a user enters the plaintext version of the user credential. However, instead of displaying the actual alphanumeric keys entered by the user, the user credential application 122 may mask each character entered with asterisks.

At block 304, the credential entry application 122 sends the plaintext version of the user credential to the network interface controller 116. The credential entry application 122 interfaces with the network interface controller 116 through the application programming interface 124, an inter-program interface that allows programs on the client device 114 to interface the network interface controller 116.

At block 306, in one embodiment, the network interface controller 116 locally generates a user credential encryption key (UCEK) through a key derivation function. The network interface controller 116 then encrypts the plaintext version of the user credential and, at block 308, stores the locally generated UCEK internally. From that point, the plaintext version of the user credential exists only in the network interface controller 116, and the UCEK encryption key is stored exclusively in the network interface controller 116.

At block 310, the network interface controller 116, through the application programming interface 124, sends the UCEK encrypted version of the user credential to the credential entry application 122. At block 312, the credential entry application forwards the UCEK encrypted version of the user credential to the device management client 120 for storage. The device management client 120 stores the UCEK encrypted version of the user credential for future use when the client device 114 logs onto a device management system 100.

Embodiments of the encryption key storage method 200 and locally generated encryption key storage method 300 can ensure that user credentials do not exist within the client device 114 in an unencrypted form outside of the network interface controller 116. Additionally, some embodiments of the network interface controller 116 do not allow the unencrypted form of the user credential to be available to the host client device 114 in plaintext form, thus preventing software and/or malware executed on the client device 114 from extracting such credentials. Furthermore, embodiments of the methods described use the network interface controller 116 as a security service to the client device 114 to ensure credentials do not exist in the client device 114 in plaintext form outside of the network interface controller 116, thus resolving the issues of L3 transfer of L2 credentials by defining the transition points (the API primitives) in a cryptographically secure way.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including the operation to store encrypted data on the network interface controller 116.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable storage medium providing program code for use by or in connection with a computer or any instruction execution system. For the purposes of this description, a computer-usable or computer readable storage medium can be any apparatus that can store the program for use by or in connection with the instruction execution system, apparatus, or device.

The computer-useable or computer-readable storage medium can be an electronic, magnetic, optical, electromagnetic, infrared, or semiconductor system (or apparatus or device), or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A device management system comprising:
an encryption key generator to generate an encryption key, wherein the encryption key comprises a bootstrap key;
a client device to receive an encrypted bootstrap data file transmitted by a base station, wherein the encrypted bootstrap data file is encrypted with the bootstrap encryption key; and
a network interface controller coupled to the client device, the network interface controller to store the encryption key separate from a system memory of the client device;
wherein the encrypted bootstrap data file includes an encrypted user credential; and
wherein the encryption key generator further generates a user credential encryption key, wherein the user credential is encrypted with the user credential encryption key.

2. The device management system of claim 1, wherein the network interface controller is further configured to store the encryption key on the network interface controller.

3. The system of claim 1, wherein the client device includes a bootstrap client, the bootstrap client to receive the encrypted bootstrap data file via the network interface controller, and to send the encrypted bootstrap data file back to the network interface controller, wherein the network interface controller is further configured to decrypt the bootstrap data file with the bootstrap encryption key.

4. The system of claim 3, further comprising a device management client coupled to the client device, the device management client to store the encrypted user credential and to apply a plaintext bootstrap image to the client device, wherein the network interface controller is further configured to send the plaintext bootstrap image to the device management client through the bootstrap client.

5. The system of claim 1, further comprising a credential entry application coupled to the client device, the credential entry application to allow a user to locally generate a plaintext user credential at the client device.

6. The system of claim 5, wherein the network interface controller is further configured to encrypt the locally generated plaintext user credential with a locally generated user credential encryption key.

7. The system of claim 6, wherein the network interface controller is further configured to store the locally generated user credential encryption key separate from the system memory of the client device.

8. An encryption key storage method comprising:
receiving a bootstrap data file encrypted with a bootstrap encryption key over a network interface at a client device, wherein the encrypted bootstrap data file comprises a bootstrap image and a user credential encrypted with a user credential encryption key; and
storing the bootstrap encryption key of the encrypted bootstrap data file on a network interface controller of the client device, wherein the network interface controller is separate from a system memory of the client device.

9. The encryption key storage method of claim 8, further comprising:
decrypting the encrypted bootstrap data file with the bootstrap encryption key; and
decrypting the encrypted user credential with the user credential encryption key.

10. The encryption key storage method of claim 9, further comprising:
receiving the encrypted bootstrap data file at the client device via the network interface controller; and sending the encrypted bootstrap data file back to the network interface controller, wherein the network interface controller is further configured to decrypt the bootstrap data file with the bootstrap encryption key.

11. The encryption key storage method of claim 10, further comprising sending a plaintext bootstrap image from the network interface controller to a device management client through the bootstrap client.

12. The encryption key storage method of claim 8, further comprising locally generating a plaintext user credential at the client device.

13. The encryption key storage method of claim 12, further comprising locally generating the user credential encryption key, and encrypting the locally generated plaintext user credential with the locally generated user credential encryption key.

14. The encryption key storage method of claim 13, further comprising storing the locally generated user credential encryption key on the network interface controller of the client device separate from the system memory of the client device.

15. An apparatus comprising:
a bootstrap client; and
a network interface controller coupled with the bootstrap client and configured to
receive a bootstrap data file transmitted over-the-air by a base station, the bootstrap data file encrypted with a bootstrap encryption key and including a user credential encrypted with a user credential encryption key;
transmit the encrypted bootstrap data file to the bootstrap client;
decrypt the bootstrap data file after receiving it back from the bootstrap client; and
transmit a plaintext bootstrap image obtained from the decrypted bootstrap data file to the bootstrap client,
wherein the bootstrap client is configured to:
receive the encrypted bootstrap data file from the network interface controller;
provide the encrypted bootstrap data file back to the network interface controller; and
receive the plaintext bootstrap image from the network interface controller,
wherein the network interface controller includes the bootstrap encryption key.

16. The apparatus of claim 15, wherein the network interface controller is further configured to compute the bootstrap encryption key based on an initial device authentication.

17. The apparatus of claim 15, further comprising a device management client configured to receive a plaintext bootstrap image from the bootstrap client.

18. The apparatus of claim 15, wherein the network interface controller is further configured to transmit, to the bootstrap client, the encrypted user credential.

* * * * *